(12) United States Patent
Masse et al.

(10) Patent No.: US 11,524,362 B2
(45) Date of Patent: Dec. 13, 2022

(54) ALUMINIUM ALLOY FOR LASER WELDING WITHOUT FILLER WIRE

(71) Applicant: CONSTELLIUM NEUF-BRISACH, Biesheim (FR)

(72) Inventors: Jean-Philippe Masse, Grenoble (FR); Laurent Cervi, Voiron (FR); Stefan Kempa, Fuertalen (CH)

(73) Assignee: Constellium Neuf-Brisach, Biesheim (FR)

( * ) Notice: Subject to any disclaimer, the term of this patent is extended or adjusted under 35 U.S.C. 154(b) by 792 days.

(21) Appl. No.: 16/470,333

(22) PCT Filed: Dec. 13, 2017

(86) PCT No.: PCT/FR2017/053531
§ 371 (c)(1),
(2) Date: Jun. 17, 2019

(87) PCT Pub. No.: WO2018/115638
PCT Pub. Date: Jun. 28, 2018

(65) Prior Publication Data
US 2020/0114468 A1   Apr. 16, 2020

(30) Foreign Application Priority Data

Dec. 19, 2016   (FR) ...................................... 1662751

(51) Int. Cl.
*B23K 26/32* (2014.01)
*C22C 21/04* (2006.01)
(Continued)

(52) U.S. Cl.
CPC .............. *B23K 26/32* (2013.01); *C22C 21/04* (2013.01); *C22F 1/043* (2013.01);
(Continued)

(58) Field of Classification Search
CPC .............. B23K 26/32; B23K 2101/006; B23K 2101/18; B23K 2103/10; C22C 21/04; C22C 21/02; C22F 1/043
See application file for complete search history.

(56) References Cited

U.S. PATENT DOCUMENTS 5,576,112 A  *  11/1996  Izuchi ..................... C22F 1/043
                                                        428/654
7,959,856 B2     6/2011  Ikuno et al.
(Continued)

FOREIGN PATENT DOCUMENTS

EP             0645465 A1      3/1995
JP             05311306 A  *  11/1993
(Continued)

OTHER PUBLICATIONS

Brockmann, R., "Laser Remote Welding of Aluminum without filler," C. Bassi, Novelis, Apr. 19, 2012. (Year: 2012).*
(Continued)

*Primary Examiner* — John A Hevey
(74) *Attorney, Agent, or Firm* — McBee Moore & Vanik IP, LLC; Susan McBee; David Vanik

(57) ABSTRACT

The invention relates to a process for laser welding monolithic semi-finished products made of aluminium alloy without filler wire, known to a person skilled in the art under the name "Remote Laser Welding" comprising the following steps:—supplying at least two semi-finished products made of aluminium alloy, at least one of which is a laminated plate with the composition (% by weight): Si: 2.5-14; Fe: 0.05-0.8; Cu: 0.25-1.0; Mg: 0.05-0.8; Mn: ≤0.70; Cr: ≤0.35; Ti: 0.02-0.30; Sr up to 500 ppm; Na up to 200 ppm; Sb up to 0.15%, unavoidable impurities <0.05 each and <0.15 in total, remainder aluminium,—laser welding the semi-finished products made of aluminium alloy without filler wire, which process is known to a person skilled in the art under
(Continued)

the name "Remote Laser Welding". The invention also includes a structural, body-in-white, skin or opening component of a motor vehicle obtained by a process according to the invention.

19 Claims, 4 Drawing Sheets

(51) Int. Cl.
  *C22F 1/043* (2006.01)
  *B23K 103/10* (2006.01)
  *B23K 101/18* (2006.01)
  *B23K 101/00* (2006.01)

(52) U.S. Cl.
  CPC .... *B23K 2101/006* (2018.08); *B23K 2101/18* (2018.08); *B23K 2103/10* (2018.08)

(56) References Cited

U.S. PATENT DOCUMENTS

| | | | | |
|---|---|---|---|---|
| 8,693,812 B2* | 4/2014 | Ehrstrom | ............... | B21K 25/00 385/12 |
| 10,661,389 B2* | 5/2020 | Masse | .................... | B23K 26/32 |
| 2005/0155676 A1 | 7/2005 | Cosse et al. | | |

FOREIGN PATENT DOCUMENTS

| | | |
|---|---|---|
| JP | H05311306 A | 11/1993 |
| JP | H08300999 A | 11/1996 |
| JP | H112705 A | 1/1999 |
| JP | 2006104580 A | 4/2006 |
| WO | 03066919 A2 | 8/2003 |

OTHER PUBLICATIONS

Xiaowei Chen, "Study on the Weldability of Al-Si (8.4-12.2%)," Jilin University: Master's Degree Thesis, (Jun. 2009), Ch. 2: 1-7.
International Search Report received from corresponding PCT/FR2017/053531, dated Feb. 20, 2018.
Weller, D., et al, "Remote Laser Welding of Multi-Alloy Aluminum at Close-Edge Position," Physics Procedia, vol. 41, pp. 164-168, Apr. 9, 2013, XP028544679.
Zhao, H., et al., "Current issues and problems in laser welding of automotive aluminum alloys," International Materials Reviews, vol. 44, Issue 6, pp. 238-266, Jun. 1, 1999.
Walker, A., "Advanced Aluminum 5XXX and 6XXX for complex Door Inner Panels and Consideration for an Aluminum-specific Design," Novelis Switzerland SA, Bad Nauheim—Doors and Closures in Car Body Engineering,. 2014.
Brockmann, R., "Laser Remote Welding of Aluminum without filler," C. Bassi, Novelis, Apr. 19, 2012.

* cited by examiner

ALUMINIUM ALLOY FOR LASER WELDING WITHOUT FILLER WIRE

CROSS REFERENCE TO RELATED APPLICATIONS

This application is a National Stage entry of International Application No. PCT/FR2017/053531 filed 13 Dec. 2017, which claims priority to French Patent Application No. 1662751, filed 19 Dec. 2016.

BACKGROUND

Field of the Invention

The invention concerns the field of automobile parts formed by stamping or extrusion, in particular parts joined by remote laser welding without filler wire. More particularly, it relates to parts made of AA6xxx series alloy according to the designation of the "Aluminum Association", with added hardening elements, and intended for the manufacture by stamping of parts for lining, structuring or reinforcing the body-in-white of automobiles.

Description of Related Art

By way of preamble, all the aluminium alloys referred to below are designated, unless otherwise indicated, according to the designations defined by the "Aluminum Association" in the "Registration Record Series", which it publishes regularly.

Unless otherwise mentioned, the information concerning the chemical composition of the alloys is expressed as percentage by weight with respect to the total weight of the alloy; "ppm" means parts per million by weight.

The definitions of the tempers are given in the European standard EN 515.

The static mechanical properties under tension, in other words the ultimate tensile strength Rm, the 0.2% offset yield strength Rp0.2, and the elongation at rupture A %, are determined by a tensile test according to standard NF EN ISO 6892-1.

Aluminium alloys are increasingly used in the construction of automobiles because their use allows the weight of vehicles to be reduced and thus reduces fuel consumption and greenhouse gas emissions.

Aluminium alloy sheet metal are used in particular for the manufacturing of many automobile structural components, in particular many parts of the "body-in-white" including: the car body skin parts (or car body exterior panels) such as the front wings, the roof or body roof, the hood, trunk and door skins; the lining parts such as, for example, door, wing, trunk lid or hood linings; and finally the structural components such as, for example, the spars, the bulkheads, the load floors and the front, middle and rear pillars.

Many skin and lining parts are already produced from aluminium alloy sheet.

For this type of applications, a set of sometimes conflicting properties is required, such as
- a high formability in the delivered temper, temper T4, in particular for stamping operations,
- a controlled yield strength in the delivered temper of the sheet metal, in order to have control of the spring back effect during forming,
- a high mechanical strength after cataphoresis and curing of paints, in order to obtain a good mechanical strength in service while minimising the weight of the part,
- good energy absorption capacity in the event of impact,
- a good behaviour in the various joining processes used for automobile car bodies, such a spot welding, laser welding, bonding, or even clinching or riveting,
- a good resistance to corrosion, in particular to intergranular corrosion, stress corrosion and filiform corrosion of the finished part,
- a compatibility with the requirements for recycling of manufacturing scrap or for recycled vehicles,
- an acceptable cost for production in long production runs.

Solutions consisting of monolithic sheets which can be joined by remote laser welding without filler wire and which have mechanical, formability and corrosion properties similar to the aluminium alloy sheets commonly used in the automotive industry are particularly useful. In the context of the present invention, monolithic shall mean a product composed of a single non-composite alloy, a composite product being, for example composed of co-rolled alloys or obtained by casting "bi-alloys".

Furthermore, the known solutions for notably reducing cracking sensitivity of aluminium alloys and which, more generally, allow improvement in weldability are increasing the silicon content beyond 2%, magnesium content beyond 5%, and copper content beyond 6% (see FIG. 1).

In the case of AA6XXX series alloys, a filler wire is used to ensure a good resistance to cracking during laser welding, which is made of an AA4XXX series alloy with high silicon content (12% for example) or an AA5XXX series alloy. It is also known that the addition of elements such as titanium or zirconium refines the solidification structure and, because of this, reduces the sensitivity to cracking during laser welding, as reported by "Current issues and problems in laser welding of automotive aluminum alloys", H. Zhao, D. R. White, and T. DebRoy, International Materials Reviews, Volume 44, Issue 6 (1 Jun. 1999), pp. 238-266, from which FIG. 1 has been taken.

A monolithic sheet metal has been developed by "Sky" for application to arc welding using the TIG-welding and MIG-welding processes, and was the subject of application U.S. Pat. No. 4,897,124. The range of composition of said sheet metal is defined in FIG. 2 with an Fe content between 0.05% and 0.5% and at least one element of the following group: Mn at a content less than 0.6%, Cr at a content less than 0.3% and Zr likewise at a content less than 0.3%. An improved weldability is claimed, as well as improved formability and corrosion resistance.

On the other hand, a multilayer composite product has been developed by "Novelis" as reported in "Advanced Aluminum 5XXX and 6XXX for complex Door Inner Panels and Consideration for an Aluminum-specific Design", A. Walker, G. Florey—Novelis Switzerland SA; Bad Nauheim—Doors and Closures in Car Body Engineering 2014 and "Laser Remote Welding of Aluminum without filler", R. Brockmann (Trumpf), C. Bassi (Novelis) 2012/04/19.

It involves an assembly made of a core sheet, or core, made of "Novelis 6200" plated with sheets of AA4XXX series alloys (with a 12% Si content, slightly less than that of eutectic Al—Si [see Laser Remote Welding of Aluminum without filler; R. Brockmann (Trumpf), C. Bassi (Novelis) 2012 Apr. 19]) as skin. Its commercial name is 6200RW or "Novelis Advanz s200 RW". It has an improved weldability during remote laser welding without filler wire, and no crack in the welded joint as specified in "Laser Remote Welding of Aluminum without filler", R. Brockmann (Trumpf), C. Bassi (Novelis) 2012 Apr. 19.

However, this type of non-monolithic product is not ideal in terms of cost and recycling.

Patent application JP2006104580 discloses an aluminium alloy sheet metal of the 3XXX series, having a good pulsed laser weldability, with composition, in % by weight, of Si: >0.20 to 0.60, Fe: 0.25 to 0.55, Cu: 0.10 to 0.35, Mn: 0.9 to 1.5, Mg: 0.25 to 0.55, remainder aluminium and unavoidable impurities, the total value of Si, Fe, Cu and Mg being less than or equal to 1.5% by weight. These sheets made of 3XXX alloy do not have the desired mechanical properties.

Patent application US2005/0155676 describes safety or structural parts obtained by moulding under pressure of an alloy containing Si: 2 to 6, Mg<0.40, Cu<0.30, Zn<0.30, Fe<0.50, Ti<0.30 at least one element for reducing adhesion to the mould such as Mn (0.3-2), Cr (0.1-0.3) Co (0.1-0.3), V (0.1 to 0.3) or Mo (0.1-0.4) and at least one element for modifying the eutectics, such as Sr (50-500 ppm), Na (20-100 ppm) or Ca (30-120 ppm). These moulded products do not have the desired geometric and mechanical properties.

Patent application JP1995109537 describes a hypo-eutectic Al—Si alloy that can be used for moulded, extruded and forged products and which has a composition containing, in % by weight, Si: 3.3-5.5, Mg: 0.2-0.7, Ti: 0.01-0.2, B: 0.0001-0.01, Fe≤0.2, P≤0.005 and Ca≤0.005 and satisfying the ratio P/Ca≤1.0 by weight. These products do not have the desired geometric and mechanical properties.

Patent application US2005/0100473 describes aluminium alloys and moulded products containing, in % by weight, Si: 4-12, Cu<0.2, Mg: 0.1-0.5, Ni: 0.2-3.0, Fe: 0.1-0.7, Ti: 0.15-0.3 and the remainder aluminium and impurities. These moulded products do not have the desired geometric and mechanical properties.

PROBLEM ADDRESSED

Aluminium alloys of the AA6XXX series, widely used in the automotive industry, are known for being very sensitive to cracking during joining by laser welding, in particular by causing critical cracks in the weld seam.

The problem addressed is that of developing an aluminium alloy sheet metal which does not form critical cracks during joining by remote laser welding without filler wire and has high mechanical properties. This aluminium alloy sheet metal must achieve the same performance or improved performance, in terms of mechanical strength, formability and corrosion, when compared with the commonly used aluminium alloys.

SUMMARY

The invention relates to a method for remote laser welding, without filler wire, of monolithic semifinished products made of aluminium alloy, comprising the following steps:

supplying at least two monolithic semifinished products made of aluminium alloy, at least one of which is a rolled sheet with composition (% by weight):

Si: 2.5-14, preferably 2.5-10.0, preferably 2.7-5.0
Fe: 0.05-0.8, preferably 0.15-0.60
Cu: 0.25-1.0, preferably 0.30-0.9, most preferably 0.5-0.8,
Mg: 0.05-0.8, preferably 0.2-0.7, most preferably 0.3-0.5
Mn: <0.70
Cr: <0.35
Ti: 0.02-0.30
Sr up to 500 ppm,
Na up to 200 ppm,
Sb up to 0.15%,
unavoidable impurities <0.05 each and <0.15 in total, remainder aluminium,
remote laser welding, without filler wire, the semifinished products made of aluminium alloy.

According to a preferred embodiment, said semifinished products constitute automobile structural components and/or automobile body-in-white components and/or motor-vehicle skin components and/or automobile vehicle closure components.

Finally, the subject matter of the invention also includes a structural, body-in-white, skin or closure component of an automobile obtained by the method according to the invention.

DETAILED DESCRIPTION OF A PREFERRED EMBODIMENT

Figure 1:
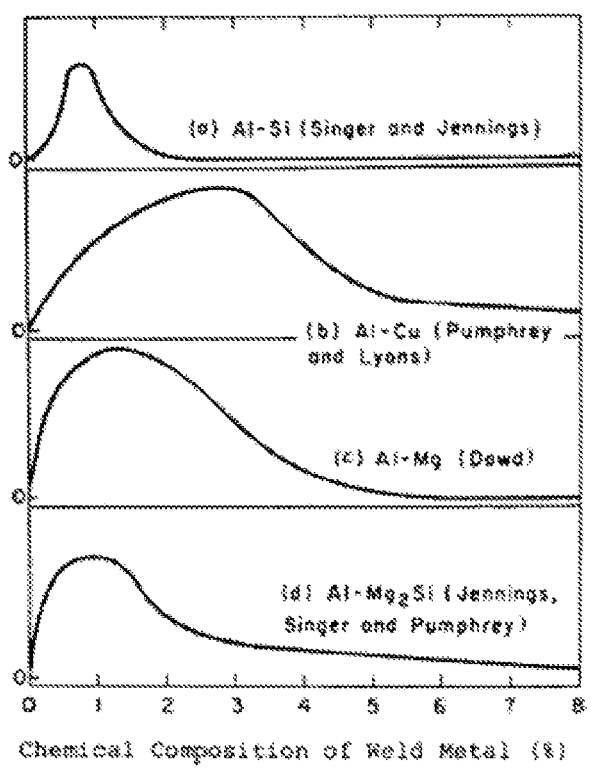
FIG. 1 illustrates the effect of the chemical composition of the welded metal on the "relative susceptibility" to cracking, or sensitivity to cracking for various binary alloys.
Figure 2:
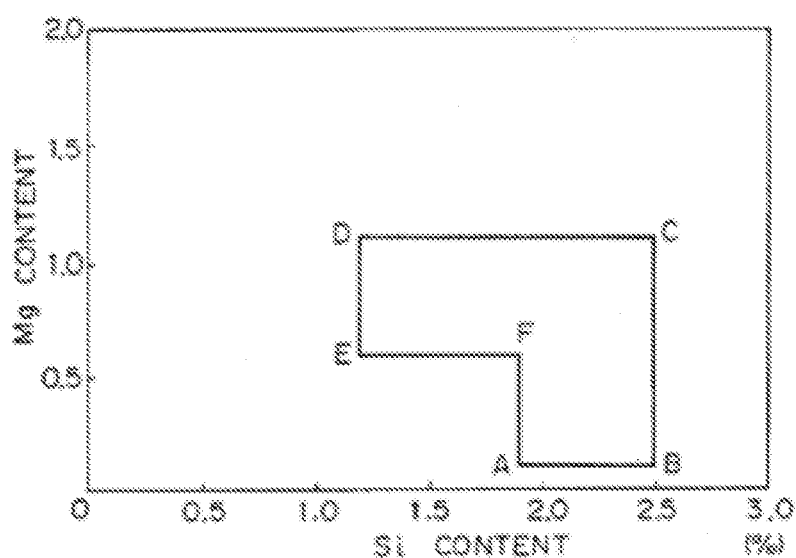
FIG. 2 shows the composition range claimed by "Sky" according to application U.S. Pat. No. 4,897,124.

The method according to the invention involves supplying monolithic semifinished products made of aluminium alloy, typically rolled sheets or extruded profiles. At least one of the semifinished products is a rolled sheet. In an embodiment of the invention, at least two of the semifinished products are rolled sheets. In another embodiment of the invention at least a second semifinished product is an extruded profile.

The method for manufacturing the monolithic sheets typically comprises casting, reheating/homogenising, hot rolling, cold rolling, solution heat treatment and quenching.

The casting is generally semi-continuous vertical casting of rolling ingots followed by scalping, or possibly continuous casting.

The reheating of the rolling ingots is typically performed to a temperature of the order of 550° C. for at least 4 h, in order to globulise the excess silicon particles when the content thereof is greater than 1.2%, and to obtain particles of circular appearance, homogeneously distributed in the thickness of the sheet. This temperature is advantageously between the solvus and solidus of the alloy considered.

After reheating, the rolling ingots typically undergo hot rolling then cold rolling. The hot rolling is no different to a hot rolling of an AA6XXX series alloy, used for door reinforcements for example The solution heat treatment, following the cold rolling, is typically carried out at a temperature of the order of 550° C., in order to recrystallise and return to solution all the free Mg and Si, before quenching. Advantageously, this temperature is between the solvus and the solidus of the alloy, as for the reheating.

In the case where a second semifinished product is a profile component, the typical manufacturing steps are similar:

the casting of billets is also generally of the semi-continuous vertical type followed by optional scalping.

The reheating of the billets before or after their cutting to length is typically carried out at a temperature of the order of 550° C. This temperature is advantageously between the solvus and the solidus of the alloy in question.

After reheating, the billets are extruded with solution heat treatment and press quenching or separate quenching.

In this last case, the solution heat treatment is typically carried out at a temperature of the order of 550° C., in order to return to solution all the free Mg and Si, before quenching. Most advantageously, this temperature is between the solvus and the solidus of the alloy, as for the reheating.

The chemical composition of said rolled sheet of the method according to the invention is (% by weight):

Si: 2.5-14, preferably 2.5-10.0, preferably 2.7-5.0
Fe: 0.05-0.8, preferably 0.15-0.60
Cu: 0.25-1.0, preferably 0.30-0.9, most preferably 0.5-0.8,
Mg: 0.05-0.8, preferably 0.2-0.7, most preferably 0.3-0.5
Mn: <0.70
Cr: ≤0.35
Ti: 0.02-0.30
Sr up to 500 ppm,
Na up to 200 ppm,
Sb up to 0.15%,
unavoidable impurities <0.05 each and <0.15 in total, remainder aluminium, The concentration ranges imposed on the constituent elements of this type of alloy are explained by the following reasons;

Si: the presence of silicon at a minimum content of 2.5% provides a significant improvement in the weldability. Above a content of 5%, the formability begins to decrease and becomes problematic above 14%, and in certain cases above 10.0%.

A preferred silicon content is 2.7 to 5.0%.

Fe: a minimum Fe content of 0.05% unexpectedly improves the weldability, whereas for a content greater than 0.8% the formability is significantly degraded.

A preferred iron content is 0.15 to 0.60%.

Cu: in a surprising manner, the present the inventors have found that the addition of copper, while improving the mechanical properties, does not significantly degrade the weldability or the corrosion resistance. The copper content is preferably ≥0.30% and more preferably ≥0.5% or even ≥0.6%. Advantageously, the maximum copper content is 0.9% and preferably 0.8%.

Mg: a minimum Mg content of 0.05% and preferably of 0.2% is necessary for the sufficient formation of $Mg_2Si$ precipitates in order to obtain the required mechanical properties after curing of paints. Its negative influence on welding imposes a maximum content limit of 0.8%.

A preferred magnesium content is 0.3 to 0.5%. In an advantageous embodiment, a copper content of 0.5-0.8% and an Mg content of 0.3-0.5% is combined.

Cr: its content is limited to 0.35%.

An addition of 0.05% or more has a hardening effect but, beyond 0.35%, the chromium forms detrimental intermetallic phases.

A preferred chromium content is 0.05 to 0.25%

Mn: its content is limited to 0.70%. An addition of manganese above 0.05% can increase the mechanical properties by a solid solution effect but, above 0.70%, it decreases the formability very strongly, a phenomenon that is already perceptible above 0.30%. In an embodiment, the Mn content is 0.05 to 0.30%. In another embodiment of the invention, the maximum Mn content is 0.2% and preferably 0.05%.

Ti: it has been observed that this element has the effect of refining the solidification structure and therefore reducing the sensitivity to cracking. A minimum Ti content of 0.02% is therefore necessary. The minimum Ti content is preferably 0.05% and, most preferably, 0.10%. By contrast, a maximum content of 0.30% and preferably of 0.25% is required in order not to form primary phases during vertical casting, which has a detrimental effect on the mechanical and formability properties.

Sr: the addition of Sr is optional. At a content less than 500 ppm, it can act on the Al—Si eutectic form during solidification, promoting the obtaining of Si particles with circular appearance and homogeneously distributed after reheating and before hot rolling. Above this content, its effect on the gassing of the cast rolling ingot becomes significant.

A preferred strontium content is 200 to 400 ppm.

The use of other elements, termed "modifiers", such as sodium Na at contents up to 200 ppm (preferably from 20 to 200 ppm) or antimony Sb at contents up to 0.15% (preferably from 0.04 to 0.15%) is also possible.

A preferred Na content is 20 to 200 ppm.

A preferred Sb content is 0.04 to 0.15%

In an advantageous embodiment, the addition of Sr alone is chosen.

The other elements are not intentionally added. There are unavoidable impurities, the content of which is <0.05 each and <0.15 in total, the remainder is aluminium.

The mechanical properties of the rolled sheet metal for the method according to the invention are advantageously, in the T4 delivered temper, $Rp_{0.2} \geq 165$ MPa and preferably $Rp_{0.2} \geq 175$ MPa and/or $Rm \geq 310$ MPa and preferably $Rm \geq 330$ MPa. The mechanical properties of the rolled sheet used for the method according to the invention are advantageously, after treatment representative of the curing of paints, strain hardening under stretching of 2% followed by 20 minutes at 180° C., $Rp_{0.2} \geq 240$ MPa and preferably $Rp_{0.2} \geq 260$ MPa and/or $Rm \geq 340$ MPa and preferably $Rm \geq 360$ MPa.

The mechanical properties of the metal after a treatment simulating post-forming precipitation, strain hardening under stretching of 5% in the direction perpendicular to the direction of rolling, followed by 30 minutes at 205° C., are advantageously $Rp_{0.2} \geq 280$ MPa, preferably $Rp_{0.2} \geq 310$ MPa and most preferably $Rp_{0.2} \geq 350$ MPa and/or $Rm \geq 330$ MPa and preferably $Rm \geq 360$ MPa and most preferably $Rm \geq 380$ MPa and/or a normalised bending angle $\alpha_{norm}$ measured according to standard NF EN ISO 7438 and the procedure VDA 238-100 of at least 50° and preferably at least 60°.

The rolled sheet used preferably has a thickness between 0.5 mm and 4 mm and most preferably between 1 and 3 mm.

Figure 3:
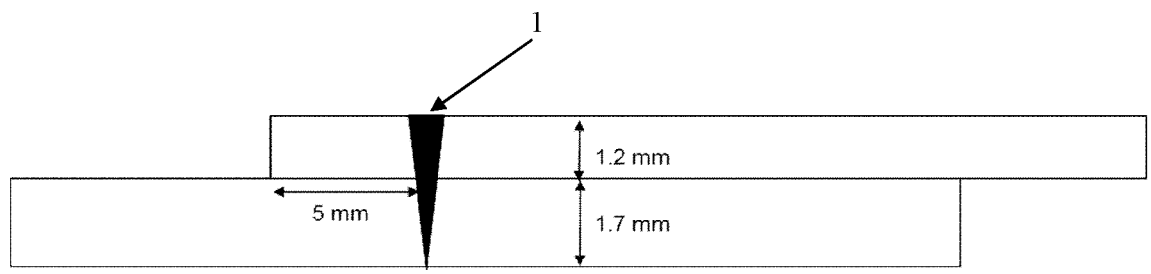
FIG. 3 schematically illustrates a typical laser welding device configuration viewed as a transverse cross-section, with the laser weld bead at 1.
Figure 7:
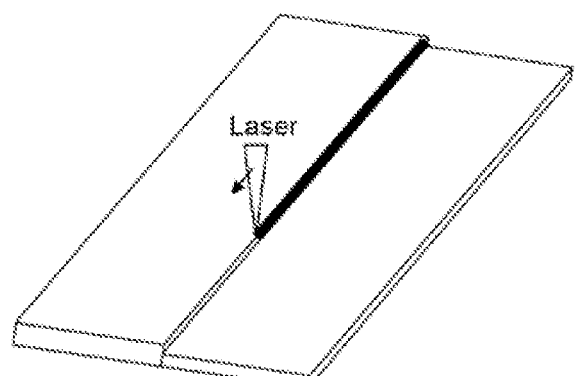
FIG. 7 schematically illustrates an end-to-end welding device configuration for the production of a spliced blank.

The method according to the invention can be used, in particular, for welding by superposition, as illustrated in FIG. 3 or for welding in end-to-end configuration as illustrated by FIG. 7. It is also been observed that the tendency for cracking during welding was significantly less when said rolled sheet having a composition according to the invention was positioned above the other semifinished product or products during welding, i.e. on the side impacted by the laser beam. This advantage is obtained in the case of welding by superposition. Thus, in an advantageous embodiment, the rolled sheet of composition according to the invention is positioned on the side of impact of the laser beam.

Advantageously, the spliced welding configuration makes it possible to obtain a spliced blank after welding, preferably characterised in that at least two of said semifinished products have a different thickness and/or a different mechanical strength.

The invention also concerns a spliced blank consisting of a plurality of semifinished products, at least one of which is a rolled sheet having a composition according to the invention and being joined by spliced welding according to a method according to the invention of welding without filling wire.

The essential advantage of the invention is the possibility of using a monolithic rolled sheet, having improved weldability, in particular during remote laser welding without filler wire, a welding method generally known to a person skilled in the art under the name of "Remote Laser Welding", as well as properties of formability and corrosion resistance that are at least comparable to those of AA6XXX series alloys conventionally used for automobile parts and having high mechanical properties.

The targeted applications cover automobile structural components, in particular many parts of the "body-in-white" including: the car body skin parts (or car body exterior panels) such as the front wings, the roof or body roof, the hood, trunk and door skins; the lining parts such as, for example, door, wing, trunk lid or hood linings; and finally the structural components such as, for example, the spars, the bulkheads, the load floors and the front, middle and rear pillars. Advantageously, the invention makes it possible to produce reinforcement parts such as door reinforcements.

The method according to the invention, wherein said semifinished products constitute automobile structure components and/or automobile body-in-white components, motor-vehicle skin components and motor-vehicle closure components, is advantageous.

The method according to the invention thus makes it possible to obtain particularly advantageous structural, body-in-white, skin and closure automobile components.

EXAMPLES

Different alloys were prepared, the compositions of which are given in Table 1. Alloys 8 and 9 have a composition according to the invention. Alloys 1 to 7 are reference alloys.

TABLE 1

Composition of the various alloys tested.

| Alloy | Alloying elements (% by weight) | | | | | | | | |
|---|---|---|---|---|---|---|---|---|---|
| | Si | Fe | Cu | Mn | Mg | Cr | Zn | Ti | Sr |
| 1 | 3.39 | 0.24 | 0.200 | 0.10 | 0.24 | 0 | 0 | 0.03 | 0 |
| 2 | 3.50 | 0.24 | 0 | 0.10 | 0.80 | 0 | 0.035 | 0.14 | 0.03 |
| 3 | 3.30 | 0.26 | 0.021 | 0.10 | 0.83 | 0.10 | 0 | 0.02 | 0.03 |
| 4 | 4.52 | 0.42 | 0.021 | 0.10 | 0.25 | 0.10 | 0 | 0.11 | 0 |
| 5 | 2.73 | 0.41 | 0.021 | 0.11 | 0.25 | 0.11 | 0 | 0.11 | 0 |
| 6 | 2.74 | 0.39 | 0.048 | 0.10 | 0.25 | 0.10 | 0 | 0.10 | 0 |
| 7 | 2.78 | 0.40 | 0.100 | 0.10 | 0.24 | 0.10 | 0 | 0.10 | 0 |
| 8 (Invention) | 4.57 | 0.16 | 0.41 | 0.02 | 0.71 | 0.11 | 0 | 0.15 | 0.03 |
| 9 (Invention) | 4.60 | 0.16 | 0.68 | 0.02 | 0.41 | 0.11 | 0 | 0.15 | 0.03 |

Sheets of thickness 1.2 and 1.7 mm were prepared from these alloys according to the manufacturing parameters summarised in Table 2.

TABLE 2

Manufacturing parameters

Process parameters

| Alloy | Reheating temperature (° C.) | Reheating holding time (h) | Temperature at start of hot rolling (° C.) | Final hot rolling temperature (° C.) | Thickness after hot rolling (mm) | Thickness after cold rolling (mm) | Solution heat treatment temperature (° C.) | Holding time at solution heat treatment temperature(s) | Temperature at end of quenching (° C.) | Pre-aging temperature (° C.) | Pre-aging time (h) |
|---|---|---|---|---|---|---|---|---|---|---|---|
| 1 | 550 | 4 | 530 | 280 | 6 | 1.2/1.7 | 550 | 120 | 85 | 85 | 8 |
| 2 | 550 | 4 | 530 | 280 | 6 | 1.2/1.7 | 550 | 120 | 20 | 85 | 8 |
| 3 | 550 | 4 | 530 | 280 | 6 | 1.2/1.7 | 550 | 120 | 20 | 85 | 8 |
| 4 | 550 | 4 | 530 | 280 | 6 | 1.2/1.7 | 550 | 120 | 20 | 85 | 8 |
| 5 | 550 | 4 | 530 | 280 | 6 | 1.2/1.7 | 550 | 120 | 20 | 85 | 8 |
| 6 | 550 | 4 | 530 | 280 | 6 | 1.2/1.7 | 550 | 120 | 20 | 85 | 8 |
| 7 | 550 | 4 | 530 | 280 | 6 | 1.2/1.7 | 550 | 120 | 20 | 85 | 8 |
| 8 | 550 | 4 | 530 | 280 | 6 | 1.2/1.7 | 550 | 120 | 20 | 85 | 8 |
| 9 | 550 | 4 | 530 | 280 | 6 | 1.2/1.7 | 550 | 120 | 20 | 85 | 8 |

Welding Tests

Figure 4:
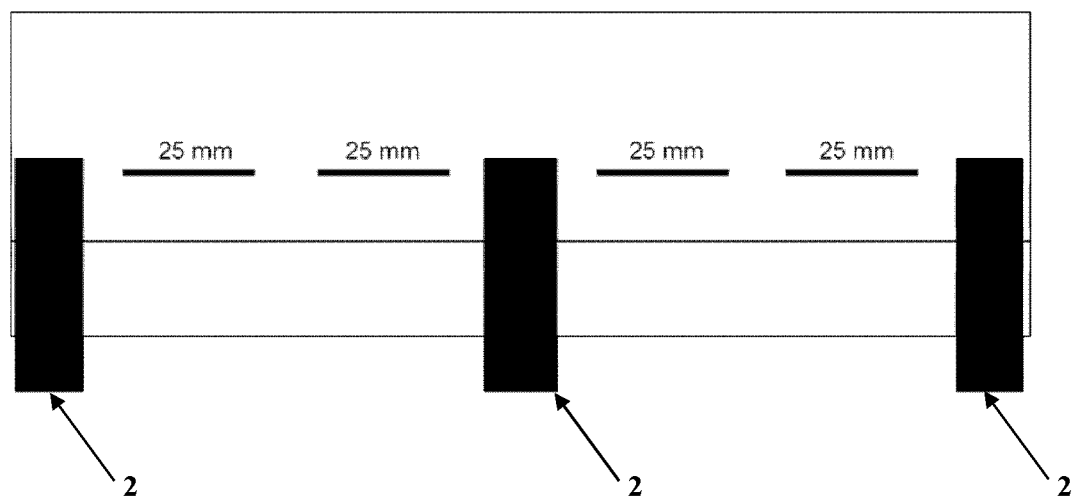
FIG. 4 illustrates the same laser welding device viewed from above with the attachments or clamps shown in black (2).

The laser welding was carried out by using a sheet of 1.2 mm thickness to cover a sheet of 1.7 mm thickness and of the same chemical composition, as shown in the diagrams of FIGS. 3 and 4.

For each alloy, 16 weld beads are produced.

The laser welding parameters used are as follows:

Laser power: 3 kW

Welding speed: 3.4 m/min

No filler wire

No protective gas

The cracks were evaluated according to the following method:

A transverse section is produced on each weld bead.

After metallographic mounting and polishing, each of the sections is observed by optical microscopy in order to determine the size of any cracks in the bead.

An average is then taken over the 16 sections in order to obtain the average crack.

It is then possible to determine the fraction of cracks having a length greater than a certain length.

In this case, for each of the alloys, the average length of cracks, the fraction of cracks having a length exceeding 0.2 times the thickness of the upper sheet, and the fraction of cracks having a length exceeding 0.4 times the length of the upper sheet, are determined.

All the results are summarised in Table 3.

TABLE 3

Welding test results

| | | Welding performance | |
|---|---|---|---|
| Alloy | Average length of cracks (*1.2 mm) | Fraction of cracks of length greater than 0.2 * 1.2 mm | Fraction of cracks of length greater than 0.4 * 1.2 mm |
| 1 | 0.19 | 0.38 | 0.13 |
| 2 | 0.33 | 0.56 | 0.31 |
| 3 | 0.54 | 0.88 | 0.63 |
| 4 | 0.06 | 0.00 | 0 |
| 5 | 0.29 | 0.50 | 0.25 |
| 6 | 0.44 | 0.69 | 0.50 |
| 7 | 0.39 | 0.69 | 0.38 |
| 8 | 0.44 | 0.69 | 0.50 |
| 9 | 0.06 | 0.00 | 0 |

The examples of the invention have a sufficient weldability (example 9) or even excellent weldability (example 8), contrary to what would have been expected given the addition of copper. Hence, the comparison of reference examples 4, 5 and 6 seems to show a degradation of the weldability with increasing content of copper, whereas the alloys according to the invention, for which the copper content is even greater, show sufficient weldability. The example of reference 3 has insufficient welding properties.

Tensile Tests

The tensile tests at ambient temperature have been carried out according to standard NF EN ISO 6892-1 with non-proportional test pieces of geometry widely used for the sheet metals and corresponding to test piece type 2 of table B.1 and appendix B of the standard. These test pieces notably have a width of 20 mm and a calibrated length of 120 mm. The percentage elongation following break is measured using a strain gauge of base 80 mm and is therefore denoted $A_{80}$ conforming with the standard.

As mentioned in the note of paragraph 20.3 of standard ISO 6892-1 :2009(F) (page 19), it is important to note that "comparisons of percentage elongation are only possible when the length between marks or the base length of the strain gauge, the shape and the area of the transverse cross-section are the same or when the coefficient of proportionality, k, is the same."

In particular, it is not possible to directly compare values of percent elongation $A_{50}$ measured with a strain gauge base of 50 mm with values of percentage elongation $A_{80}$ measured with a strain gauge base of 80 mm. In the particular case of a test piece of same geometry taken in a same material, the value of percent elongation $A_{50}$ will be higher than the value of percent elongation $A_{80}$ and given by the relation: $A_{50}=Ag+(A_{80}-Ag)*80/50$ where Ag, in %, is the plastic extension at maximum force, also called "generalised elongation" or "elongation at necking".

The results of these mechanical tests are summarised in Table 4.

TABLE 4

Mechanical test results

| | Mechanical properties | | | | | | | |
|---|---|---|---|---|---|---|---|---|
| | T4 | | | | T4 + Paint curing | | | |
| Alloy | Rp$_{0.2}$ (MPa) | Rm (MPa) | Ag (%) | A80 (%) | Rp$_{0.2}$ (MPa) | Rm (MPa) | Ag (%) | A80 (%) |
| 1 | 87 | 206 | 21.3 | 27.0 | 205 | 263 | 8.6 | 8.6 |
| 2 | 156 | 299 | 19.8 | 23.0 | 272 | 331 | 10.2 | 11.2 |
| 3 | 183 | 287 | 19.6 | 22.7 | 299 | 358 | 12.4 | 13.7 |
| 4 | 110 | 237 | 22.0 | 25.3 | 199 | 272 | 14.8 | 19.9 |
| 5 | 111 | 238 | 21.7 | 24.1 | 204 | 276 | 14.3 | 17.4 |
| 6 | 111 | 240 | 21.8 | 24.5 | 206 | 277 | 14.1 | 17.0 |
| 7 | 112 | 241 | 20.6 | 22.8 | 210 | 282 | 13.8 | 16.5 |
| 8 | 188 | 337 | 19.6 | 22.2 | 278 | 364 | 16.8 | 20.6 |
| 9 | 171 | 329 | 22.2 | 25.7 | 275 | 362 | 15.5 | 18.1 |

It is observed that the mechanical properties in the T4 or T4+ paint curing temper of the alloys according to the invention are superior to those of the reference alloys, except in the case of alloy 3, but that alloy has an insufficient weldability.

For the products according to the invention, the mechanical properties have also been characterised after 5% deformation in the direction perpendicular to the direction of rolling and a heat treatment of 30 minutes at 205° C., characteristic of a post-forming precipitation treatment, as well as the bending characteristics.

Figure 8:
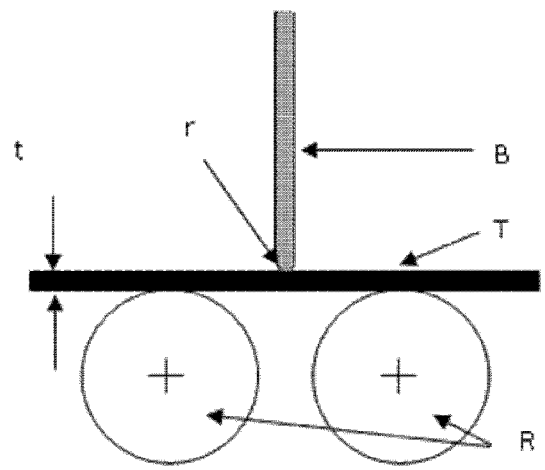
FIG. 8 schematically illustrates the bending measurement.

The three-point bend test has been carried out according to standard NF EN ISO 7438 and procedure VDA 238-100. The bending device is as presented in FIG. 8.

The "three-point bending" of the metal T of thickness t is carried out using a punch B of radius r=0.2 mm, the sheet being supported by two rolls R, the bending axis being perpendicular to the pretensioning direction. The rolls have a diameter of 30 mm and the distance between the axes of the rolls is equal to 30+2t mm, t being the thickness of the sheet tested.

Figure 9:
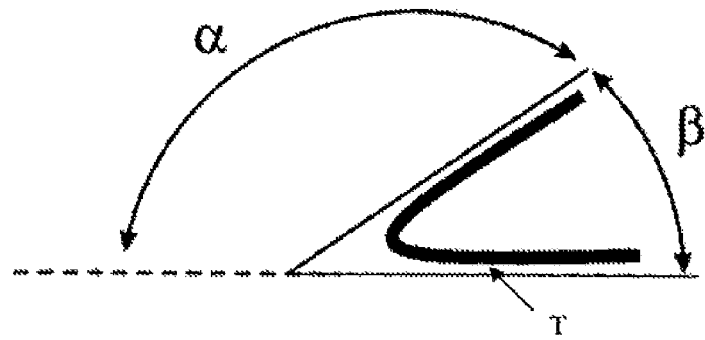
FIG. 9 schematically illustrates the bending angle α measurement.

At the start of the test, the punch is placed in contact with the sheet with a pre-force of 30 newtons. Once the contact is established, the movement of the punch is indexed at zero. The test then consists of moving the punch so as to carry out the "three-point bending" of the sheet. The test is stopped when a microcracking of the sheet leads to a drop in force on the punch of at least 30 newtons, or when the punch is moved by 14.2 mm which corresponds to the maximum allowed travel. At the end of the test, the sample sheet has been bent as illustrated in FIG. 9. The ductility in service is then evaluated by measuring the angle of bending α. The higher the angle α, the better the ability of the sheet to bend. The angle α obtained is normalised according to the equation:

$$\alpha_{norm} = \alpha \frac{\sqrt{t}}{\sqrt{ref}}$$

where ref corresponds to a thickness of 2 mm.

The results of these bend tests on the sheets that have been produced according to the conditions described in the paragraph entitled "Preamble" are given in Table X.

The results of the mechanical tests and bend tests after 5% deformation and 30 minutes at 205° C. are given in Table 5.

TABLE 5

Results of the mechanical tests and bend tests

5% deformation and 30 minutes at 205° C.

| | Mechanical properties | | | | Bending |
|---|---|---|---|---|---|
| Reference | $Rp_{0.2}$ (MPa) | Rm (MPa) | Ag (%) | A80 (%) | $\alpha_{norm}$ |
| 8 | 372 | 396 | 5.9 | 7.1 | 53° |
| 9 | 340 | 376 | 8.6 | 11.0 | 64° |

Measurement of the LDH (Limit Dome Height)

These LDH (Limit Dome Height) measurements have been made in order to characterise the stamping performance of the different sheets of this example.

The parameter LDH is widely used for evaluating the suitability for stamping of sheets of thickness 0.5 to 3.0 mm. It has been the subject of many publications, in particular that of R. Thompson, "The LDH test to evaluate sheet metal formability—Final Report of the LDH Committee of the North American Deep Drawing Research Group", SAE conference, Detroit, 1993, SAE Paper n° 930815.

It involves a test of stamping a blank clamped at the periphery by a retaining ring. The blank clamping pressure is checked to avoid slipping in the retaining ring. The blank, of dimensions 120×160 mm, is biased in a mode close to planar deformation. The punch used is hemispherical.

Figure 5:
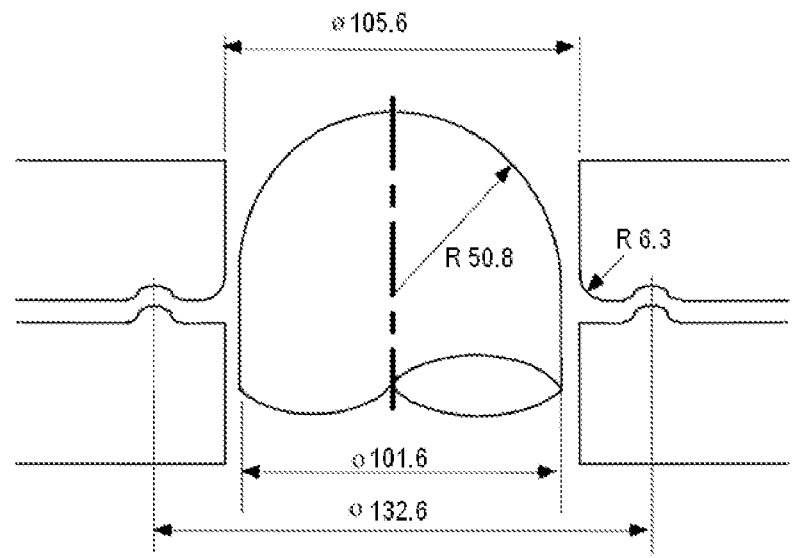
FIG. 5 specifies the dimensions in mm of the tools used to determine the value of the parameter known to a person skilled in the art by the term Limit Dome Height (LDH) characteristic of the suitability of the material for stamping.

FIG. 5 specifies the dimensions of the tools used for carrying out this test.

The lubrication between the punch and the sheet is provided by graphite grease (Shell HDM2 grease). Speed of descent of the punch is 50 mm/min. The so-called LDH value is the value of the movement of the punch at break, i.e. the limit depth of the stamping. It corresponds to the average of three tests, giving a 95% confidence interval over the measurement of 0.2 mm.

Table 6 below indicates the values of the LDH parameter obtained on the test pieces of 120×160 mm cut in the above-described sheets of thickness 1.2 mm and for which the 160 mm dimension was positioned parallel to the direction of rolling.

TABLE 6

Formability test results

| Reference | Formability LDH120 (mm) |
|---|---|
| 1 | 23.9 |
| 2 | |
| 3 | |
| 4 | 26.0 |
| 5 | 26.3 |
| 6 | 26.1 |
| 7 | 26.3 |
| 8 | 26.7 |
| 9 | 27.7 |

Evaluation of the Corrosion Resistance

Figure 6:
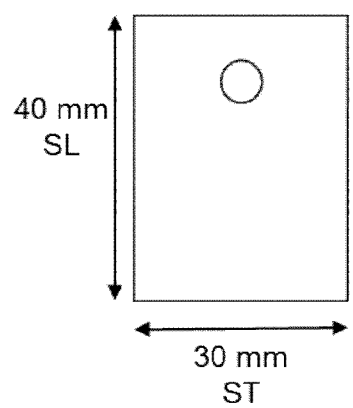
FIG. 6 is a diagram of the test pieces used for the intergranular corrosion resistance tests.

The intergranular corrosion test according to standard ISO 11846 consists of immersing the test pieces according to FIG. 6 for 24 h in a solution of sodium chloride (30 g/l) and hydrochloric acid (10 ml/l) at a temperature of 30° C. (obtained by means of holding in a drying oven), after pickling with hot soda (5% by mass) and nitric acid (70% by mass) at ambient temperature.

The test pieces have a size of 40 mm (direction of rolling)×30 mm×thickness.

The type and depth of the corrosion brought about are determined by an examination of the metal in metallographic section. The thickness of the median and maximum corrosion is measured on each test piece.

The results are summarised in Table 7 below.

TABLE 7

Corrosion test results

| | Intergranular corrosion | |
|---|---|---|
| Reference | Median corroded depth (μm) | Maximum corroded depth (μm) |
| 1 | 141 | 164 |
| 2 | | |
| 3 | 61 | 91 |
| 4 | 30 | 67 |
| 5 | 36 | 78 |
| 6 | 48 | 72 |
| 7 | 76 | 101 |
| 8 | 117 | 134 |
| 9 | 115 | 138 |

It was observed that the improvement in the compromise between the welding quality and the mechanical strength, in particular for examples 8 and 9 according to the invention, is achieved without notably altering the resistance to corrosion.

The invention claimed is:

1. A method for laser welding, without filler wire, monolithic semifinished products made of aluminium alloy, comprising:
   supplying at least two monolithic semifinished products made of aluminium alloy, at least one of which is a rolled sheet with the composition (% by weight):
   Si: 2.5-14,
   Fe: 0.05-0.8,
   Cu: 0.25-1.0,
   Mg: 0.05-0.8,
   Mn: ≤0.70,
   Cr: ≤0.35,
   Ti: 0.02-0.30,
   Sr up to 500 ppm,
   Na up to 200 ppm,
   Sb up to 0.15%,
   unavoidable impurities <0.05 each and <0.15 in total, remainder aluminium,
   laser welding, without filler wire, the semifinished products made of aluminium alloy.

2. The method according to claim 1, wherein said rolled sheet is in a T4 temper, and has $Rp_{0.2}$>165 MPa and/or Rm>310 MPa.

3. The method according to claim 1, wherein said rolled sheet has, after treatment representative of the curing of paints, strain hardening under stretching of 2% followed by 20 minutes at 180° C., $Rp_{0.2}$≥240 MPa and/or Rm>340 MPa.

4. The method according to claim 1, wherein after a treatment simulating post-forming precipitation, strain hardening under stretching of 5% in the direction perpendicular to the direction of rolling, followed by 30 minutes at 205° C., the rolled sheet has $Rp_{0.2}>280$ MPa, and/or $Rm>330$ MPa and/or a normalised bending angle $\alpha_{norm}$ measured according to standard NF EN ISO 7438 and the procedure VDA 238-100 of at least 50°.

5. The method according to claim 1, wherein the Mg content is between 0.3 and 0.5%.

6. The method according to claim 1, wherein the Si content is between 2.5 and 10.0%.

7. The method according to claim 1, wherein the Sr content is between 200 and 400 ppm and/or the Na content is between 20 and 200 ppm and/or the Sb content is between 0.04 and 0.15%.

8. The method according to claim 1, wherein the Fe content is between 0.15 and 0.60%.

9. The method according to claim 1, wherein the Cu content is between 0.3 and 0.9%.

10. The method according to claim 1, wherein the copper content is 0.5-0.8% and the Mg content is 0.3-0.5%.

11. The method according to claim 1, wherein said laser welding, without filler wire, of semifinished products made of aluminium alloy is carried out by superposition or in end-to-end configuration.

12. The method according to claim 1, wherein said semifinished products constitute automobile structure components and/or automobile body-in-white components and/or motor-vehicle skin components and/or motor-vehicle closure components.

13. A structural, body-in-white, skin or closure component of an automobile, obtained by the method according to claim 1.

14. The method according to claim 1, wherein said rolled sheet is in a T4 temper, and has $Rp0.2>175$ MPa and/or $Rm>330$ MPa.

15. The method according to claim 1, wherein said rolled sheet has, after treatment representative of the curing of paints, strain hardening under stretching of 2% followed by 20 minutes at 180° C., $Rp_{0.2} \geq 260$ MPa and/or $Rm>360$ MPa.

16. The method according to claim 1, wherein after a treatment simulating post-forming precipitation, strain hardening under stretching of 5% in the direction perpendicular to the direction of rolling, followed by 30 minutes at 205° C., the rolled sheet has $Rp_{0.2}>310$ MPa, and/or $Rm>360$ MPa and/or a normalised bending angle $\alpha_{norm}$ measured according to standard NF EN ISO 7438 and the procedure VDA 238-100 of at least 60°.

17. The method according to claim 1, wherein after a treatment simulating post-forming precipitation, strain hardening under stretching of 5% in the direction perpendicular to the direction of rolling, followed by 30 minutes at 205° C., the rolled sheet has $Rp_{0.2}>350$ MPa, and/or $Rm>380$ MPa and/or a normalised bending angle $\alpha_{norm}$ measured according to standard NF EN ISO 7438 and the procedure VDA 238-100 of at least 60°.

18. The method according to claim 1, wherein the Cu content is between 0.5 and 0.8%.

19. The method according to claim 1, wherein the Si content is between 2.7 and 5.0%.

* * * * *